Figure 1:
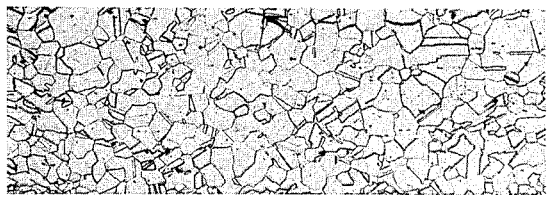

United States Patent [19]

Gray

[11] 3,929,470

[45] Dec. 30, 1975

[54] GLASS-METAL SEALING ALLOY

[75] Inventor: Thomas H. Gray, Pittsburgh, Pa.

[73] Assignee: Allegheny Ludlum Industries, Inc., Pittsburgh, Pa.

[22] Filed: Sept. 21, 1973

[21] Appl. No.: 399,589

[52] U.S. Cl. .................................. 75/122; 75/128 T
[51] Int. Cl.² .......................................... C22C 38/50
[58] Field of Search .......................... 75/122, 128 T

[56] References Cited
UNITED STATES PATENTS

| | | | |
|---|---|---|---|
| 1,489,243 | 4/1924 | Giring | 75/128 T |
| 2,266,482 | 12/1941 | Pilling | 75/128 T |
| 2,730,260 | 1/1956 | McCullough | 75/128 T |
| 2,793,948 | 5/1957 | Wagner | 75/128 T |
| 3,366,473 | 1/1968 | Nehrenberg | 75/122 |
| 3,843,332 | 10/1974 | Kindlimann | 75/128 T |

Primary Examiner—L. Dewayne Rutledge
Assistant Examiner—Arthur J. Steiner
Attorney, Agent, or Firm—Vincent G. Gioia; Robert F. Dropkin

[57] ABSTRACT

A fine grained alloy containing 38–45% nickel, 3–15% chromium, up to 0.1% carbon, from 0.1–1.0% titanium and the balance iron and residuals that is useful for production of glass-to-metal seals is disclosed.

4 Claims, 5 Drawing Figures

GLASS-METAL SEALING ALLOY

BACKGROUND

For many purposes it is necessary to form seals or bonds between glass and metal. Examples of such purposes are light bulbs or vacuum tubes wherein metal wires or prongs must pass through glass envelopes in which vacuum or special atmosphere is maintained. Another example is the metal cap that seals the open end of a glass envelope such as a television picture tube. To be useful for such purposes, particularly when the seal must be sound over a temperature range, it is essential that the metal have very special characteristics.

Of primary importance is that the thermal expansion characteristics of the metal must be the same as, or very similar to, the thermal expansion characteristics of the glass. If there is a great difference in thermal expansion characteristics, the brittle glass envelope will shatter when temperature changes are experienced.

It is also important that the metal can be prepared with an adherent oxide coating that is compatible with glass. During the sealing process, the glass must be able to wet the oxide coating and bond to it, and it is also essential that the oxide coating to which the glass is bonded is sufficiently adherent to the metal so that it will not break away and so that a vacuum seal can be formed.

Alloys suitable for sealing to glass are known and one of the most widely used of these is an alloy containing from 38–45% nickel, usually about 42%; from 3–15% chromium, usually about 5.5%; and the remainder iron and residuals. Manganese is frequently employed in small amounts (typically 0.15–0.25%) to improve the melting characteristics of the alloy. When a composition is indicated as a percent herein, the percent by weight of the total composition is indicated.

Thermal expansion characteristics, the character of the glass coating, and particularly the grain growth characteristics of metals are sensitive to impurities. It is desirable to prepare alloys for bonding to glass by vacuum induction melting in order that extremely clean alloys can be prepared. Alloys thus produced are worked to final form employing both hot working and cold working steps. For example, many such alloys are subjected to a series of hot rolling and cold rolling steps with intermediate annealing steps, and the final grain pattern in such metal is unpredictable.

Particularly with large elements for bonding to glass, such as the anode caps for television tubes, large grains are prevalent and they produce an effect known as "orange peel" which describes the appearance of the metal surface. The large grains cause forming defects in parts which render them unacceptable for their intended uses.

THE INVENTION

This invention includes an alloy comprising from about 38–45% nickel, from about 3–15% chromium, from about 0.1–1.0% titanium, not more than 0.1% carbon and the balance iron and residuals. The preferred alloy of this invention contains about 41–43% nickel, about 5.2–6.0% chromium and about 0.2–0.7% titanium.

The basis of the invention is the discovery that titanium in limited quantities predictably causes grains in the desirable size range to grow, even though the metal is prepared by extremely clean methods such as vacuum induction melting and subjected to both hot and cold reductions to thin gauges with numerous intermediate annealing steps. Titanium added to the alloy of this invention has no significant influence on those physical characteristics, such as thermal expansion, which are important to formation of a metal-glass bond that will hold a vacuum. Rather the titanium composition of the alloys of this invention causes desirable and predictable grain sizes which are optimum for the fabrication of components used in glass-to-metal seals.

A DETAILED DESCRIPTION OF THE INVENTION

Ideal coefficients of thermal expansion for alloys employed in glass-to-metal seals are those coefficients of expansion that are identical to the expansion characteristics of the glass at all temperatures. Such an ideal cannot be met, but alloys of general utility for this purpose have coefficients as set forth in Table I.

TABLE I

| Temperature Range (°C) | Coefficient (μm/m°C) |
| --- | --- |
| 30 – 425 | 9.7 – 10.4 |
| 30 – 350 | 8.5 – 9.2 |

Although alloys exhibiting thermal expansion characteristics set forth in Table I are of general utility, metals having expansion characteristics slightly beyond these ranges have more limited utility.

To demonstrate the present invention, five alloys were prepared having the compositions set forth in Table II.

TABLE II

| Component | Alloy Number and Composition (%w) | | | | |
| --- | --- | --- | --- | --- | --- |
|  | 1 | 2 | 3 | 4 | 5 |
| Ni | 40.6 | 42.0 | 41.8 | 41.6 | 42.0 |
| Cr | 5.95 | 5.49 | 5.40 | 5.44 | 5.44 |
| Ti | 0.10 | 0.20 | 0.41 | 0.70 | 1.00 |
| C | 0.047 | 0.046 | 0.040 | 0.069 | 0.042 |
| Mn | 0.19 | 0.23 | 0.13 | 0.15 | 0.18 |
| P | 0.01 | 0.01 | 0.01 | 0.01 | 0.01 |
| S | 0.003 | 0.004 | 0.003 | 0.004 | 0.003 |
| Si | 0.30 | 0.29 | 0.34 | 0.34 | 0.28 |
| Al | 0.26 | 0.24 | 0.22 | 0.20 | 0.22 |
| Mo | 0.028 | 0.028 | 0.030 | 0.030 | 0.027 |
| Cu | 0.080 | 0.090 | 0.078 | 0.080 | 0.085 |
| Cd | 0.01 | 0.01 | 0.01 | 0.01 | 0.01 |
| N | 0.0022 | 0.0024 | 0.0012 | 0.0012 | 0.0014 |
| Co | 0.030 | 0.030 | 0.028 | 0.025 | 0.030 |
| H | 0.0002 | 0.0003 | 0.0002 | 0.0001 | 0.0002 |
| O | 0.0023 | 0.0063 | 0.0051 | 0.0036 | 0.0024 |
| Fe | Balance | Balance | Balance | Balance | Balance |

All of alloys 1–5 were prepared by induction vacuum melting after which they were hot worked to a hot rolled band gauge of 0.125 inches, cold rolled to 0.05 inches, annealed at 1925°F for 3 minutes in hydrogen with a dew point of 20°F, cold rolled to 0.010 inches and annealed again for 1.5 minutes at 1925°F. Table III below sets forth the thermal expansion characteristics of alloys 1 through 5 inclusive.

TABLE III

| Temperature Range (°C) | Coefficient (μm/m°C) | | | | |
| --- | --- | --- | --- | --- | --- |
|  | 1 | 2 | 3 | 4 | 5 |
| 30 – 425 | 10.6 | 10.2 | 10.3 | 10.6 | 10.8 |
| 30 – 350 | 9.3 | 8.8 | 9.0 | 9.2 | 9.5 |

Figure 2:
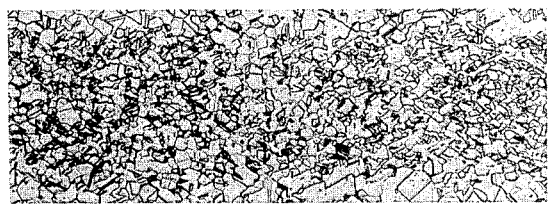
Figure 3:
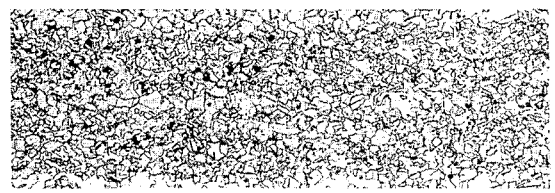
Figure 4:
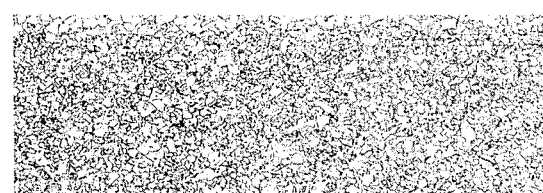
Figure 5:
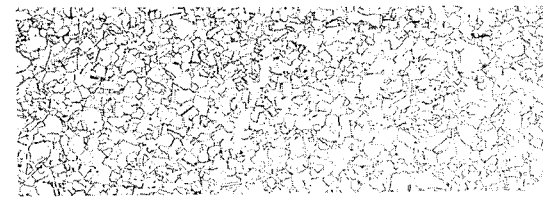

FIGS. 1–5 inclusive are photomicrographs of alloys 1–5 respectively which illustrate the grain structure of the alloys at 100X magnification after the alloys were prepared for microphotography by convention means using a mixed acids etch.

It may be noted from FIGS. 1–5 that a transition in grain size occurs between alloys containing more than 0.1% and less than 1.0% titanium. Alloys intermediate these extreme titanium compositions have smaller grains than either extreme. In other words, a minimum grain size appears to occur in alloys containing between 0.4 and 0.7% titanium, while larger grain sizes occur when the alloys contain less than 0.1% titanium or more than 1.0% titanium. All of alloys 1–5 have grains that are small enough to form adequate glass-to-metal seals after they have been worked into shapes conforming with the glass. The grain sizes of the metals pictured in FIGS. 1–5 are all smaller than ASTM No. 6 grains, and for the most part they are smaller than ASTM No. 8 grains.

When strips of alloys 1–5 are formed into anode caps for television picture tubes and fixed to the tubes by conventional methods for forming glass-to-metal seals, sound seals are produced which adequately maintain the desired conditions within the picture tubes throughout the range of temperatures to which the seals are exposed.

I claim:

1. An alloy consisting essentially of from 38% to 45% nickel, from 3% to 15% chromium, from 0.1% to 1.0% titanium, up to 0.1% carbon and the balance iron and residuals; said alloy having a grain size finer than ASTM No. 6.
2. The alloy of claim 1 wherein the nickel content is from about 41–43%.
3. The alloy of claim 1 wherein the chromium content is about 5.4%–6.0%.
4. The alloy of claim 1 wherein the titanium content is from about 0.2–0.7%.

* * * * *